(12) United States Patent
Des Roches-Dionne et al.

(10) Patent No.: US 11,300,054 B2
(45) Date of Patent: Apr. 12, 2022

(54) FUEL FLOW CONTROL SYSTEM AND METHOD FOR ENGINE START

(71) Applicant: PRATT & WHITNEY CANADA CORP., Longueuil (CA)

(72) Inventors: Nicolas Des Roches-Dionne, Longueuil (CA); Sylvain Lamarre, Boucherville (CA); Simon Lopez, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 467 days.

(21) Appl. No.: 16/184,297

(22) Filed: Nov. 8, 2018

(65) Prior Publication Data

US 2020/0149479 A1 May 14, 2020

(51) Int. Cl.
*F02C 7/26* (2006.01)
*F02C 7/262* (2006.01)
*F02C 3/06* (2006.01)
*F02C 9/26* (2006.01)

(52) U.S. Cl.
CPC ............ *F02C 7/262* (2013.01); *F02C 3/06* (2013.01); *F02C 7/26* (2013.01); *F02C 9/26* (2013.01); *F05D 2220/32* (2013.01); *F05D 2270/092* (2013.01)

(58) Field of Classification Search
CPC .. F02C 7/262; F02C 7/26; F02C 7/264; F02C 9/26; F02C 9/262; F02C 9/28; F02C 3/06; F05D 2270/092; F05D 2220/32
See application file for complete search history.

(56) References Cited

U.S. PATENT DOCUMENTS

| | | | | |
|---|---|---|---|---|
| 3,520,133 A | * | 7/1970 | Loft | F02C 7/26 60/790 |
| 5,121,597 A | * | 6/1992 | Urushidani | F02C 7/26 60/733 |
| 5,129,221 A | * | 7/1992 | Walker | F02C 7/262 60/778 |
| 5,212,943 A | | 5/1993 | Harris | |
| 5,303,541 A | | 4/1994 | Goff et al. | |
| 5,551,227 A | * | 9/1996 | Moulton | F02C 7/262 60/39.091 |
| 6,516,263 B1 | * | 2/2003 | Keller | F02C 7/262 60/39.281 |
| 6,978,597 B2 | | 12/2005 | McKelvey et al. | |
| 7,168,254 B2 | | 1/2007 | Riley | |
| 8,915,088 B2 | | 12/2014 | Ajami et al. | |

(Continued)

*Primary Examiner* — Gerald L Sung
*Assistant Examiner* — Rene D Ford
(74) *Attorney, Agent, or Firm* — Norton Rose Fulbright Canada LLP (57) ABSTRACT

Systems and methods for controlling fuel flow to an engine during start are provided. Fuel is caused to be injected into a combustor of the engine according to a first fuel schedule defining a minimum fuel flow limit required to achieve light-off of the engine, the minimum fuel flow limit set at an initial value. Following light-off of the engine, at least one operating parameter of the engine is monitored. Based on the at least one operating parameter, occurrence of flameout in the engine is detected. In response to detecting occurrence of flameout in the engine, the minimum fuel flow limit is increased from the initial value to a first value to obtain an adjusted fuel schedule, and fuel is caused to be injected into the combustor according to the adjusted fuel schedule.

19 Claims, 5 Drawing Sheets

(56) References Cited

U.S. PATENT DOCUMENTS

| | | | |
|---|---|---|---|
| 2004/0200206 A1 | 10/2004 | McKelvey et al. | |
| 2014/0095051 A1* | 4/2014 | Lamarre | F02C 9/20 |
| | | | 701/103 |
| 2018/0258863 A1* | 9/2018 | Backman | F02C 3/04 |

* cited by examiner

FUEL FLOW CONTROL SYSTEM AND METHOD FOR ENGINE START

TECHNICAL FIELD

The present disclosure relates generally to fuel flow control for engine start.

BACKGROUND OF THE ART

In a gas turbine engine, continuous inlet air is compressed, mixed with fuel in an inflammable proportion, and exposed to an ignition source to ignite the mixture which then continues to burn to produce combustion products. The engine starting process however involves some challenges as different extremes of the ground and flight envelope may have conflicting requirements. For instance, for a same altitude and temperature, a cold soak static engine start would not allow the same acceleration as a warm engine being restarted in an aircraft flying at high speed. As a result, a single fuel and acceleration schedule cannot be used to efficiently start the engine under all conditions while avoiding undesirable behavior, such as compressor stall, over temperature, engine hang or flameout.

Therefore, improvements are needed.

SUMMARY

In accordance with a broad aspect, there is provided a method for controlling fuel flow to an engine during start. The method comprises causing fuel to be injected into a combustor of the engine according to a first fuel schedule defining a minimum fuel flow limit required to achieve light-off of the engine, the minimum fuel flow limit set at an initial value, monitoring, following light-off of the engine, at least one operating parameter of the engine, detecting, based on the at least one operating parameter, occurrence of flameout in the engine, and, in response to detecting occurrence of flameout in the engine, increasing the minimum fuel flow limit from the initial value to a first value to obtain an adjusted fuel schedule, and causing fuel to be injected into the combustor according to the adjusted fuel schedule.

In accordance with another broad aspect, there is provided a system for controlling fuel flow to an engine during start. The system comprises at least one processing unit and at least one non-transitory computer-readable memory having stored thereon program instructions executable by the at least one processing unit for causing fuel to be injected into a combustor of the engine according to a first fuel schedule defining a minimum fuel flow limit required to achieve light-off of the engine, the minimum fuel flow limit set at an initial value, monitoring, following light-off of the engine, at least one operating parameter of the engine, detecting, based on the at least one operating parameter, occurrence of flameout in the engine, and, in response to detecting occurrence of flameout in the engine, increasing the minimum fuel flow limit from the initial value to a first value to obtain an adjusted fuel schedule, and causing fuel to be injected into the combustor according to the adjusted fuel schedule.

In accordance with yet another broad aspect, there is provided a non-transitory computer readable medium having stored thereon program code executable by at least one processor for causing fuel to be injected into a combustor of the engine according to a first fuel schedule defining a minimum fuel flow limit required to achieve light-off of the engine, the minimum fuel flow limit set at an initial value, monitoring, following light-off of the engine, at least one operating parameter of the engine, detecting, based on the at least one operating parameter, occurrence of flameout in the engine, and, in response to detecting occurrence of flameout the engine, increasing the minimum fuel flow limit from the initial value to a first value to obtain an adjusted fuel schedule, and causing fuel to be injected into the combustor according to the adjusted fuel schedule.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
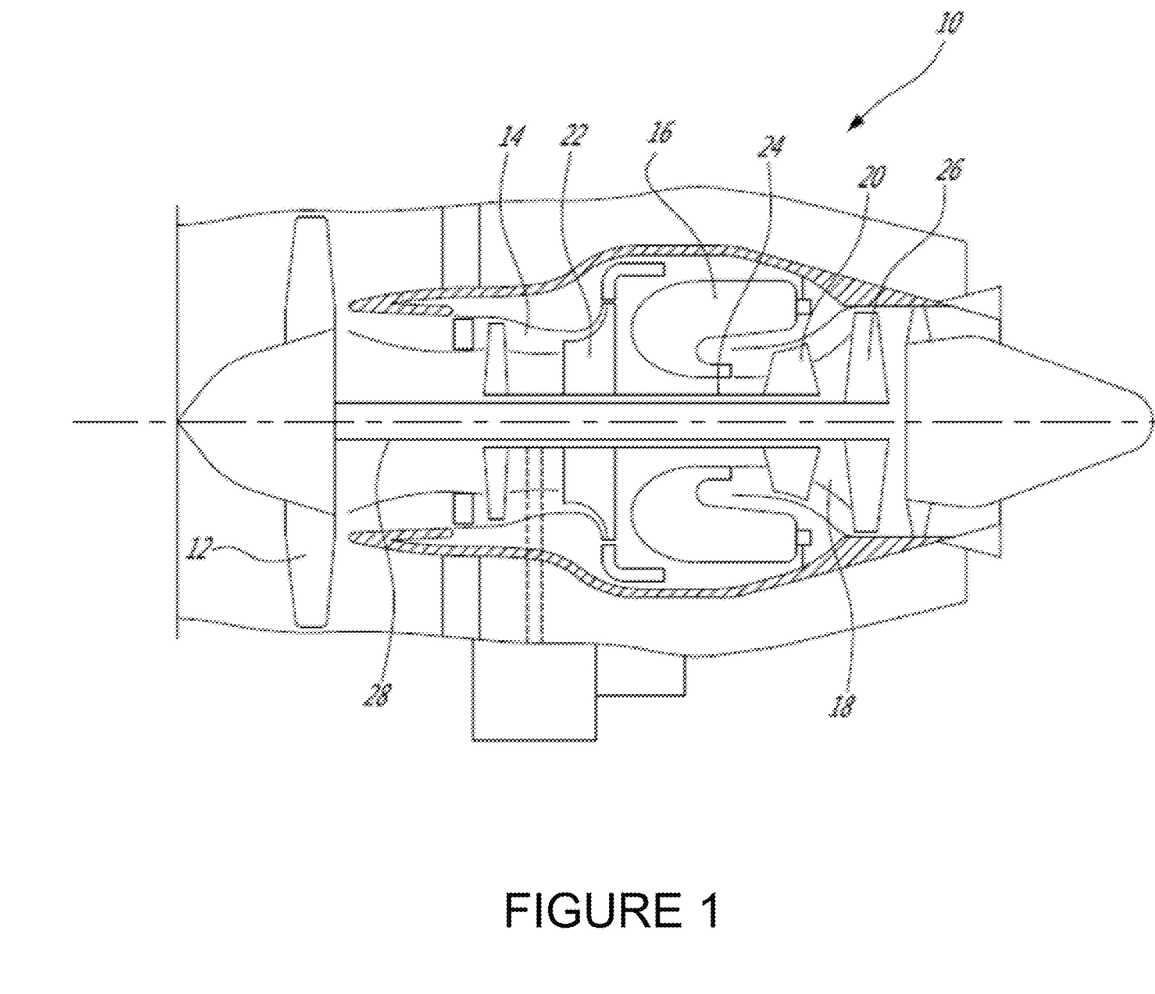
FIG. 1 is a schematic cross-sectional view of a gas turbine engine, in accordance with an illustrative embodiment.

FIG. 1 illustrates a gas turbine engine 10 of a type preferably provided for use in subsonic flight, generally comprising in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. A turboprop engine may also apply. In addition, although the engine 10 is described herein for flight applications, it should be understood that other uses, such as industrial or the like, may apply.

Figure 2:
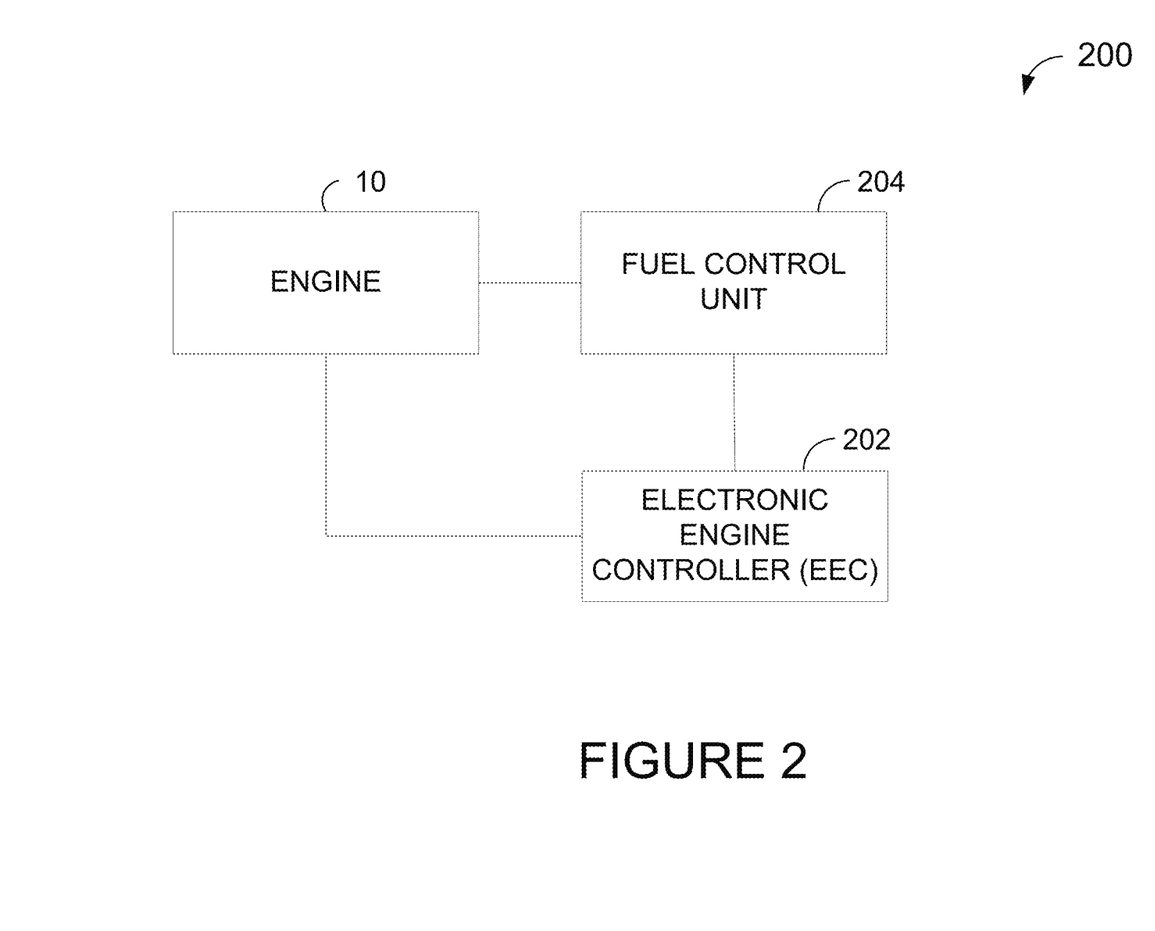
FIG. 2 is a block diagram of a system for controlling fuel flow during start of the engine of FIG. 1, in accordance with an illustrative embodiment.

Referring now to FIG. 2 in addition to FIG. 1, the starting (or start-up) process of the gas turbine engine 10 illustratively comprises two consecutive phases. In the first phase, the high pressure rotor(s) 22 of the compressor section 14 are rotated by a torque provided by an external source, such as a starter (not shown), in order to provide air flow into the combustor 16. Once a predetermined compressor pressure or speed has been reached, fuel flow is then injected into the combustor 16 at a controlled rate. For this purpose, an electronic engine controller (EEC) 202 illustratively outputs one or more control signals to a fuel control unit 204 to cause the injection of fuel flow. In one embodiment, the fuel control unit 204 comprises a fuel pump and a stepper (not shown), a torque motor valve (not shown), or any suitable equivalent means for injecting fuel into the combustor 16.

The EEC 202 may be part of a Full Authority Digital Engine Control (FADEC), which is used to control the operation and performance of the engine 10. The EEC 202 selects the appropriate fuel schedule for the light-off procedure by querying a memory storing one or more fuel schedules. The memory may also store therein all data (e.g., engine operating parameters) sensed or measured as well as other predetermined data and programs. In one embodiment, the fuel schedule, which is selected in the first phase of the engine starting process, follows an open loop fuel flow profile in which fuel flow is commanded based on a desired rotational speed of the compressor section 14. The fuel schedule may thus be referred to herein as an "open loop fuel schedule" and the first phase may be referred to as direct fuel flow control.

The fuel flow is injected to mix with the air flow and the mixture is then exposed to an ignition source (e.g., a spark igniter, not shown). Light-off of the combustion process occurs in the combustor 16 when an appropriate fuel/air ratio is reached, resulting in ignition of the engine 10. In one embodiment, the light-off occurrence is detected by monitoring an exhaust temperature of the engine 10, with light-off being detected when the exhaust temperature reaches a threshold temperature (e.g., 200° F.). In one embodiment, the inter-stage turbine temperature (ITT), which is the temperature of the exhaust gases between the high and low pressure turbines of the engine 10, is used as the exhaust temperature. The exhaust temperature may be monitored using a temperature sensor (not shown) associated with an exhaust outlet (not shown) of the engine 10. In another embodiment, an ultraviolet or photoelectric signal, which may be generated by any suitable flame detection measurement system and indicates the presence of visible flames at the exhaust outlet of the engine 10, may be monitored by the EEC 202 to detect light-off. In another embodiment, light-off can be detected following a predetermined increase in the inter-stage turbine temperature. In yet another embodiment, light-off is detected when the gas generator (i.e. engine speed reaches a predetermined value. Other embodiments may apply.

In the second phase of the starting process (i.e. following light-off), the fuel flow is continuously injected into the combustor 16, thus enabling local ignition to propagate and spread so as to form stable combustion in the combustor 16. The speed of the engine 10 is then accelerated by increasing the injection of fuel flow until the engine 10 operates under a self-sustained speed. In particular, the fuel flow is injected according to a fuel schedule required for operation of the engine 10 from light-off to a self-sustaining condition. The appropriate fuel schedule is selected by the EEC 202. In one embodiment, in the second phase, the fuel schedule follows a closed loop fuel profile in which fuel flow is commanded to achieve a desired acceleration of the compressor section 14. The fuel schedule may thus be referred to herein as a "closed loop fuel schedule" and the second phase may be referred to as sub-idle acceleration governing or closed loop sub-idle acceleration scheduling.

As will be discussed further below with reference to FIG. 3, the EEC 202 is used to adjust fuel flow to the combustor 16 upon detection of engine flameout during start of the engine 10. It should be understood that the engine start may occur in-flight or on the ground. As used herein, the term "flameout" refers to the run-down of the engine 10 that may be caused by the extinction of the flame in chamber(s) of the combustor 16. During engine flameout, the combustor 16 does not burn all of the fuel supplied to it, which in turn reduces the overall engine performance and efficiency. When flameout only occurs in some, but not all, (i.e. a subset of) chambers of the combustor 16, it is referred to as "partial flameout". For engines having a single combustion chamber, partial flameout is observed when flameout occurs in a section of the chamber. When flameout occurs in all chambers of the combustor 16, it is referred to as "complete flameout" or "full flameout". As known to those skilled in the art, flameout may be caused by high velocity air entering the engine 10. Flameout may also be caused by improper fuel-air mixture or interruption of the airflow through the engine 10. This may be the result of a given engine operating condition, such as acceleration of the engine 10 decreasing below a predetermined threshold. As used herein, the term "flameout condition" thus refers to an operating condition of the engine 10 that, if not corrected, results in flameout. In one embodiment, the methods (e.g., implemented by the EEC 202) and systems described herein are used during high speed in-flight restart. In particular and as will be described further below, the EEC 202 is configured to detect engine flameout following light-off of the engine 10 and to accordingly increase the minimum (e.g., open loop) fuel flow injection into the combustor 16 to avoid a subsequent partial or complete flameout.

Figure 3:
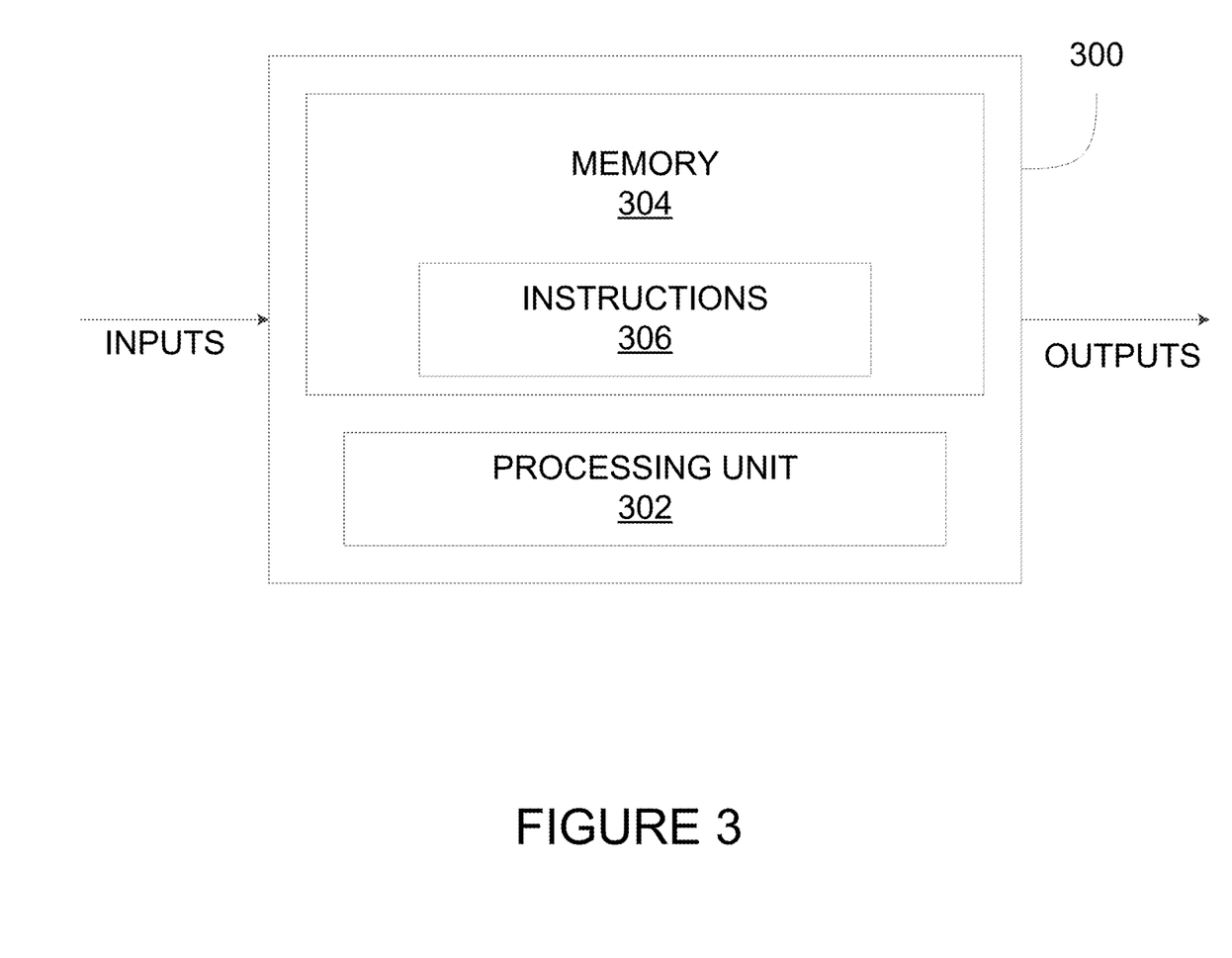
FIG. 3 is a block diagram of a computing device for implementing the system of FIG. 2, in accordance with an illustrative embodiment.

FIG. 3 is an example embodiment of a computing device 300 for implementing the EEC 202 described above with reference to FIG. 2. The computing device 300 comprises a processing unit 302 and a memory 304 which has stored therein computer-executable instructions 306. The processing unit 302 may comprise any suitable devices configured to cause a series of steps to be performed such that instructions 306, when executed by the computing device 300 or other programmable apparatus, may cause the functions/acts/steps specified in the method described herein to be executed. The processing unit 302 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 304 may comprise any suitable known or other machine-readable storage medium. The memory 304 may comprise non-transitory computer readable storage medium, for example, but not limited to, an electronic, magnetic, optical, electromagnetic, infrared, or semiconductor system, apparatus, or device, or any suitable combination of the foregoing. The memory 304 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 304 may comprise any storage means (e.g., devices) suitable for retrievably storing machine-readable instructions 306 executable by processing unit 302.

Figure 4:
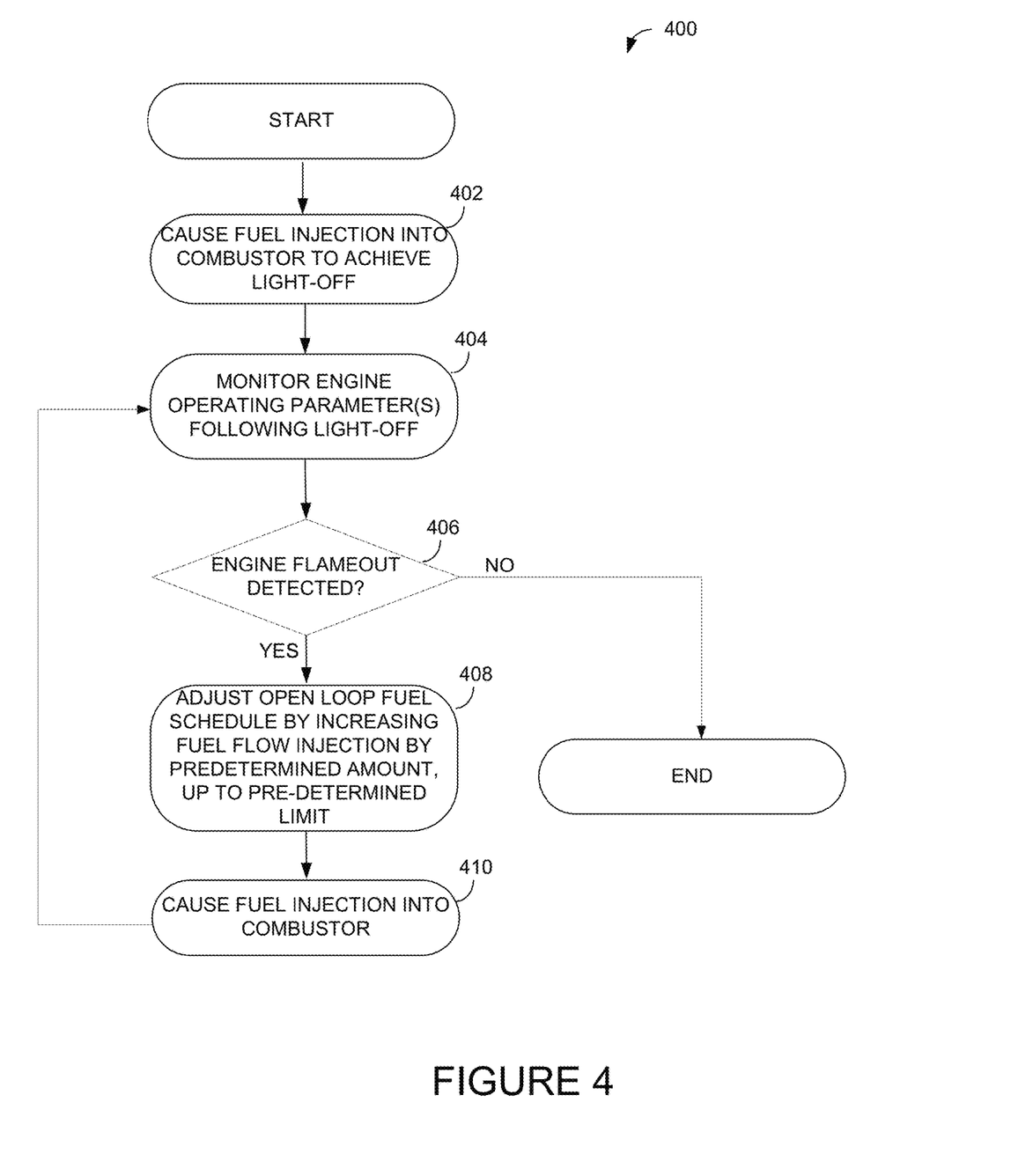
FIG. 4 is a flowchart of a method for controlling fuel flow during start of the engine of FIG. 1, in accordance with an illustrative embodiment.

Referring now to FIG. 4, an example method 400 for controlling fuel flow during engine start will now be described. The method 400 may be implemented by the EEC 202 of FIG. 2, i.e. by the computing device 300 of FIG. 3. The method 400 comprises, at step 402, causing fuel injection into the combustor (reference 16 in FIG. 1) in order to achieve light-off. As discussed above with reference to FIG. 2, step 402 may comprise the EEC 202 outputting to the fuel control unit (reference 204 in FIG. 2) control signal(s) comprising instructions to cause the fuel control unit to inject the fuel flow to the combustor, according to a given fuel schedule. One or more schedules may be stored in memory (reference 304 in FIG. 3) in any suitable format (e.g. as map(s)) and the EEC 202 illustratively queries the memory to select the fuel schedule that is appropriate for light-off. In one embodiment, the appropriate fuel schedule follows an open loop fuel flow profile. The fuel schedule illustratively defines a minimum fuel flow limit and a maximum fuel flow limit, the minimum and maximum fuel flow limit each set at an initial value also stored in the memory. The minimum and maximum fuel flow limits illustratively correspond to an amount of fuel injected into the combustor 16.

Following light-off of the engine (reference 10 in FIG. 1), one or more engine operating parameters are monitored at step 404 to detect engine flameout. The one or more operating parameters are monitored with the engine 10 operating in the closed loop sub-idle acceleration scheduling. In one embodiment, the acceleration of the engine 10 is monitored at step 404. It should however be understood that any other suitable engine operating parameter that may be used to detect a flameout in the engine 10 may apply. For example, the engine operating parameter(s) monitored at step 404 may also include, but are not limited to, inter-stage turbine temperature. An assessment as to whether engine flameout, whether partial or complete, is detected is then made at step 406, based on the engine operating parameter(s) monitored at step 404. For example, if acceleration of the engine 10 is monitored at step 404, step 406 may comprise comparing the acceleration to a threshold value. If it is determined that the acceleration is below the threshold value, partial flameout is detected.

If no engine flameout is detected at step 406, the method 400 may end. Otherwise, if engine flameout is detected at step 406, the next step 408 is to adjust the open loop fuel schedule by increasing fuel flow injection by a predetermined amount. It should be understood that the predetermined amount of fuel injection increase may vary depending on engine configuration (e.g., depending on factors including, but not limited to, gas generator speed, altitude, temperature, and number of partial flameouts detected during engine start). In particular, the initial value of the minimum fuel flow limit associated with the open loop fuel schedule is increased by the predetermined amount so as to set the minimum fuel flow limit at a first adjusted value, which is lower than the maximum fuel flow limit. A first adjusted fuel schedule is thus obtained. The EEC 202 may then output one or more control signals to cause fuel flow to be injected into the combustor, e.g., when the engine restarts, according to the first adjusted fuel schedule.

After fuel injection has been increased by the predetermined amount, the next step 410 is to cause fuel flow injection into the combustor. In this manner, the engine 10 may be recovered from flameout. Steps 404 to 410 are then repeated and engine parameter(s) are monitored again at step 404 to detect any subsequent engine flameout (step 406). If it is determined at step 406 that no subsequent engine flameout has been detected, the method 400 may end. Otherwise, the fuel injection is increased again at step 408, by a same or different amount as previously and up to a pre-determined limit. For this purpose, the value of the minimum fuel flow limit is increased from the first adjusted value to a second adjusted value lower than the maximum fuel flow limit. A second adjusted fuel schedule is thus obtained and the EEC 202 may then output one or more control signals to cause fuel flow to be injected into the combustor, e.g., when the engine restarts, according to the second adjusted fuel schedule. After fuel injection has been increased again, the method 400 may then proceed again to step 410. It should be understood that the process of adjusting the open loop fuel schedule (e.g., steps 404 to 408) may be repeated every time engine flameout is detected, up to a pre-determined limit (e.g. a maximum fuel flow limit or a maximum number of fuel flow increases). It should also be understood that once the pre-determined limit is reached, no more fuel can be added should a subsequent partial flameout be detected.

Figure 5:
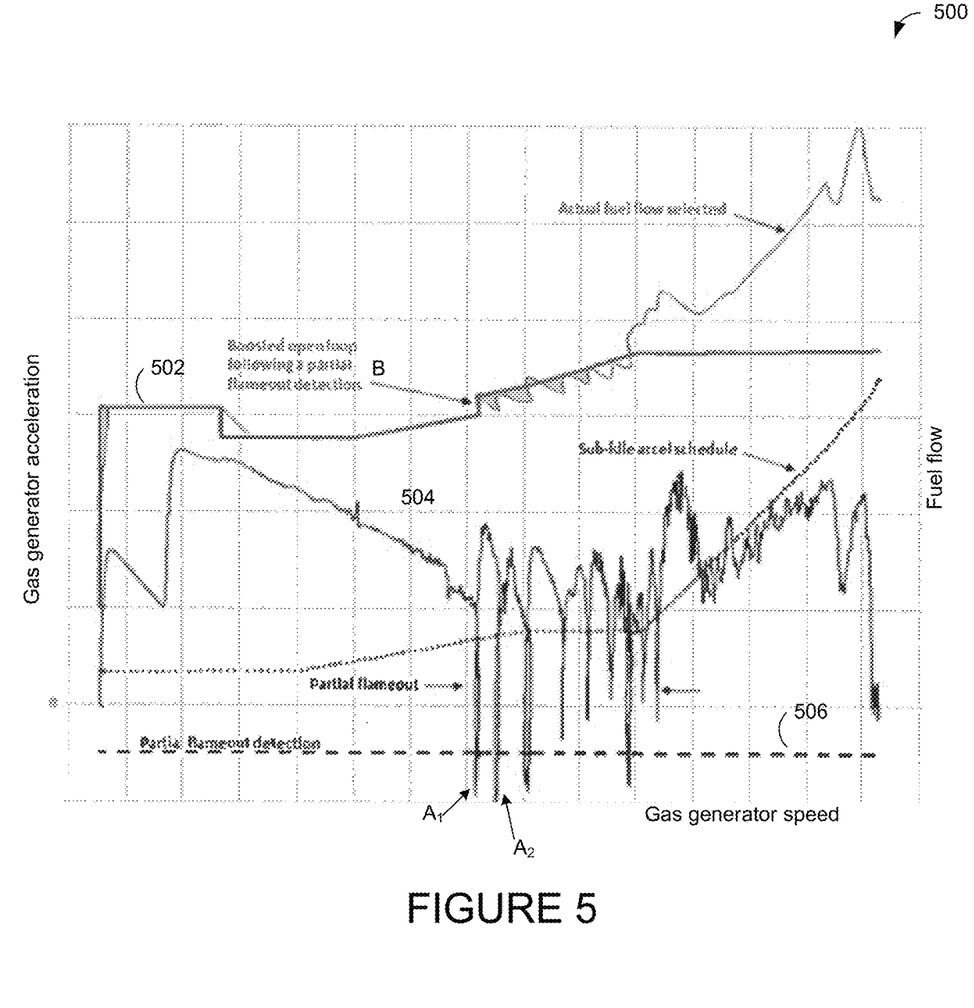
FIG. 5 is a plot of fuel flow and gas generator acceleration as a function of gas generator speed, in accordance with an illustrative embodiment.

FIG. 5 shows a plot 500 illustrating fuel flow (represented by curve 502) and gas generator (i.e. engine) acceleration (represented by curve 504) as a function of gas generator (i.e. engine) speed. Fuel flow is injected (following an open loop fuel flow profile) at a varying rate into the combustor to reach light-off. Engine acceleration is continuously monitored and compared to a threshold 506. When the engine acceleration drops below the threshold (as seen, for example, at point $A_1$), partial flameout is detected. The open loop fuel flow injection is then increased (see, for example, at point B) by adjusting the minimum fuel flow limit to a higher value. The engine acceleration accordingly increases above the threshold 506. If another flameout is detected (as seen, for example, at point $A_2$), the open loop fuel flow injection would be increased once more. As discussed above, as long as flameout is detected, the process of adjusting the open loop fuel schedule can be repeated, up to a pre-determined limit (e.g. the maximum fuel flow limit or the maximum number of fuel flow increases is reached). In this manner, it may be possible to limit the number of flameout occurrences during engine start.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for controlling fuel flow to an aircraft engine during start, the method comprising:
    causing fuel to be injected into a combustor of the aircraft engine, according to an open loop fuel schedule, to achieve a target rotational speed for the aircraft engine, the open loop fuel schedule defining a minimum fuel flow limit required to achieve light-off of the aircraft engine, the minimum fuel flow limit set at an initial value;

monitoring, following light-off of the aircraft engine, at least one operating parameter of the aircraft engine, the at least one operating parameter monitored while fuel is caused to be injected into the combustor, according to a closed loop fuel schedule, to maintain a target acceleration for the aircraft engine;

detecting, based on the at least one operating parameter, occurrence of flameout in the aircraft engine following light-off of the aircraft engine; and in response to detecting occurrence of flameout in the aircraft engine following light-off of the aircraft engine, increasing the minimum fuel flow limit from the initial value to a first value to obtain an adjusted open loop fuel schedule, and causing fuel to be injected into the combustor according to the adjusted open loop fuel schedule.

2. The method of claim 1, wherein monitoring the at least one operating parameter of the aircraft engine comprises monitoring an acceleration of the aircraft engine, and wherein detecting occurrence of flameout in the aircraft engine comprises comparing the acceleration to a predetermined threshold and detecting partial flameout in response to determining that the acceleration is below the threshold.

3. The method of claim 1, wherein the open loop fuel schedule defines a maximum fuel flow limit, and further wherein the first value is lower than the maximum fuel flow limit.

4. The method of claim 3, further comprising, after causing fuel to be injected according to the adjusted open loop fuel schedule:
  detecting occurrence of a subsequent flameout in the aircraft engine;
  increasing the minimum fuel flow limit from the first value to a second value lower than the maximum fuel flow limit to obtain a newly adjusted open loop fuel schedule; and
  causing fuel to be injected into the combustor according to the newly adjusted open loop fuel schedule.

5. The method of claim 1, wherein detecting occurrence of flameout in the aircraft engine comprises detecting occurrence of a partial flameout.

6. The method of claim 1, wherein detecting occurrence of flameout in the aircraft engine comprises detecting occurrence of a complete flameout.

7. The method of claim 1, wherein fuel is caused to be injected into the combustor according to the adjusted open loop fuel schedule with the aircraft engine on the ground.

8. The method of claim 1, wherein fuel is caused to be injected into the combustor according to the adjusted open loop fuel schedule while in flight.

9. The method of claim 1, wherein monitoring the at least one operating parameter of the aircraft engine comprises monitoring an inter-stage turbine temperature of the aircraft engine.

10. A system for controlling fuel flow to an aircraft engine during start, the system comprising:
  at least one processing unit; and
  at least one non-transitory computer-readable memory having stored thereon program instructions executable by the at least one processing unit for:
    causing fuel to be injected into a combustor of the aircraft engine, according to an open loop fuel schedule, to achieve a target rotational speed for the aircraft engine, the open loop fuel schedule defining a minimum fuel flow limit required to achieve light-off of the aircraft engine, the minimum fuel flow limit set at an initial value;

monitoring, following light-off of the aircraft engine, at least one operating parameter of the aircraft engine, the at least one operating parameter monitored while fuel is caused to be injected into the combustor, according to a closed loop fuel schedule, to maintain a target acceleration for the aircraft engine;

detecting, based on the at least one operating parameter, occurrence of flameout in the aircraft engine following light-off of the aircraft engine; and in response to detecting occurrence of flameout in the aircraft engine following light-off of the aircraft engine, increasing the minimum fuel flow limit from the initial value to a first value to obtain an adjusted open loop fuel schedule, and causing fuel to be injected into the combustor according to the adjusted open loop fuel schedule.

11. The system of claim 10, wherein the program instructions are executable by the at least one processing unit for monitoring the at least one operating parameter of the aircraft engine comprising monitoring an acceleration of the aircraft engine, and for detecting occurrence of flameout in the aircraft engine comprising comparing the acceleration of the aircraft engine to a predetermined threshold and detecting partial flameout in response to determining that the acceleration is below the threshold.

12. The system of claim 10, wherein the program instructions are executable by the at least one processing unit for causing fuel to be injected into the combustor according to the open loop fuel schedule defining a maximum fuel flow limit, the first value being lower than the maximum fuel flow limit.

13. The system of claim 12, wherein the program instructions are executable by the at least one processing unit for, after causing fuel to be injected according to the adjusted open loop fuel schedule:
  detecting occurrence of a subsequent flameout in the aircraft engine;
  increasing the minimum fuel flow limit from the first value to a second value lower than the maximum fuel flow limit to obtain a newly adjusted open loop fuel schedule; and
  causing fuel to be injected into the combustor according to the newly adjusted open loop fuel schedule.

14. The system of claim 10, wherein the program instructions are executable by the at least one processing unit for detecting occurrence of flameout in the aircraft engine comprising detecting occurrence of a partial flameout.

15. The system of claim 10, wherein the program instructions are executable by the at least one processing unit for detecting occurrence of flameout in the aircraft engine comprising detecting occurrence of a complete flameout.

16. The system of claim 10, wherein the program instructions are executable by the at least one processing unit for causing fuel to be injected into the combustor according to the adjusted open loop fuel schedule with the aircraft engine on the ground.

17. The system of claim 10, wherein the program instructions are executable by the at least one processing unit for causing fuel to be injected into the combustor according to the adjusted open loop fuel schedule while in flight.

18. The system of claim 10, wherein the program instructions are executable by the at least one processing unit for monitoring the at least one operating parameter of the aircraft engine comprising monitoring an inter-stage turbine temperature of the aircraft engine.

19. A non-transitory computer readable medium having stored thereon program code executable by at least one processor for:
- causing fuel to be injected into a combustor of an aircraft engine, according to an open loop fuel schedule, to achieve a target rotational speed for the aircraft engine, the open loop fuel schedule defining a minimum fuel flow limit required to achieve light-off of the aircraft engine, the minimum fuel flow limit set at an initial value;
- monitoring, following light-off of the aircraft engine, at least one operating parameter of the aircraft engine, the at least one operating parameter monitored while fuel is caused to be injected into the combustor, according to a closed loop fuel schedule, to maintain a target acceleration for the aircraft engine;
- detecting, based on the at least one operating parameter, occurrence of flameout in the aircraft engine following light-off of the aircraft engine; and
- in response to detecting occurrence of flameout in the aircraft engine following light-off of the aircraft engine, increasing the minimum fuel flow limit from the initial value to a first value to obtain an adjusted open loop fuel schedule, and causing fuel to be injected into the combustor according to the adjusted open loop fuel schedule.

* * * * *